US011962040B2

(12) United States Patent
Wang et al.

(10) Patent No.: US 11,962,040 B2
(45) Date of Patent: Apr. 16, 2024

(54) BATTERY PACK (71) Applicant: SAMSUNG SDI CO., LTD., Yongin-si (KR)

(72) Inventors: Hanjun Wang, Yongin-si (KR); Chanwoo Kang, Yongin-si (KR)

(73) Assignee: SAMSUNG SDI CO., LTD., Yongin-si (KR)

(*) Notice: Subject to any disclaimer, the term of this patent is extended or adjusted under 35 U.S.C. 154(b) by 79 days.

(21) Appl. No.: 17/565,792

(22) Filed: Dec. 30, 2021

(65) Prior Publication Data
US 2022/0209370 A1 Jun. 30, 2022

(30) Foreign Application Priority Data
Dec. 30, 2020 (KR) .................. 10-2020-0188061

(51) Int. Cl.
H01M 50/519 (2021.01)
H01M 50/533 (2021.01)

(52) U.S. Cl.
CPC ....... H01M 50/519 (2021.01); H01M 50/533 (2021.01)

(58) Field of Classification Search
CPC ....... H01M 50/531; H01M 10/48–482; H01M 50/519; H01M 50/533
See application file for complete search history.

(56) References Cited

U.S. PATENT DOCUMENTS 9,716,258 B2 * 7/2017 Park ...................... H01M 50/55
2013/0266823 A1 10/2013 Lee
2014/0356672 A1 12/2014 Lee
2015/0017503 A1 1/2015 Wang et al.
2015/0044511 A1 2/2015 Kim et al.
2015/0155545 A1 6/2015 Baek
2015/0311495 A1 10/2015 Wang
2019/0131612 A1 * 5/2019 Waller ................ H01M 50/581

FOREIGN PATENT DOCUMENTS

| JP | 4984366 B2 | 5/2012 |
| KR | 10-2013-0113975 A | 10/2013 |
| KR | 10-2014-0142649 A | 12/2014 |
| KR | 10-2015-0018412 A | 2/2015 |
| KR | 10-1502900 B1 | 3/2015 |
| KR | 10-2015-0064546 A | 6/2015 |
| KR | 10-2015-0124263 A | 11/2015 |
| KR | 20190084756 | * 7/2019 |

OTHER PUBLICATIONS

Machine translation of KR20190084756, accessed May 12, 2023 (Year: 2023).*

* cited by examiner

Primary Examiner — Milton I Cano
Assistant Examiner — Albert Michael Hilton
(74) Attorney, Agent, or Firm — Lee IP Law, P.C.

(57) ABSTRACT

A battery pack includes a first cell, a second cell, and a third cell arranged along a first axis, the first cell including first tabs extending toward the second cell, the second cell including second tabs extending toward the first cell, and the third cell including third tabs extending toward the second cell, a first circuit body between the first cell and the second cell, a second circuit body between the second cell and the third cell, and a third circuit body connecting the first circuit body and the second circuit body, wherein at least one of the first through third circuit bodies includes a rigid circuit board, and at least another one of the first through third circuit bodies includes a flexible circuit board.

16 Claims, 9 Drawing Sheets

BATTERY PACK

CROSS-REFERENCE TO RELATED APPLICATION

This application is based on and claims priority under 35 U.S.C. § 119 to Korean Patent Application No. 10-2020-0188061, filed on Dec. 30, 2020, in the Korean Intellectual Property Office, the disclosure of which is incorporated by reference herein in its entirety.

BACKGROUND

1. Field

One or more embodiments relate to a battery pack.

2. Description of the Related Art

In general, secondary batteries are batteries that may be repeatedly charged and discharged unlike non-rechargeable primary batteries. Secondary batteries are used as energy sources of devices, e.g., mobile devices, electric vehicles, hybrid electric vehicles, electric bicycles, and uninterruptible power supplies. Single secondary batteries or multi-secondary batteries (secondary battery modules) in which a plurality of batteries are connected as a unit are used according to the types of external devices that employ secondary batteries.

SUMMARY

According to one or more embodiments, a battery pack may include a first cell, a second cell, and a third cell arranged along a first axis, the first cell including first tabs extending toward the second cell, the second cell including second tabs extending toward the first cell, and the third cell including third tabs extending toward the second cell, a first circuit body between the first cell and the second cell, a second circuit body between the second cell and the third cell, and a third circuit body connecting the first circuit body and the second circuit body, wherein at least one of the first through third circuit bodies includes a rigid circuit board, and at least another one of the first through third circuit bodies includes a flexible circuit board.

Each of the first through third circuit bodies may extend in a band shape along any one of the first axis and a second axis that intersects the first axis.

Each of the first through third circuit bodies may extend along only one of the first axis and the second axis, wherein a circuit assembly including the first through third circuit bodies extends in a bent shape along the first and second axes that are different from each other.

At least one of the first through third circuit bodies may extend along the first axis, and at least another one of the first through third circuit bodies may extend along the second axis, wherein the first through third circuit bodies extend along the first and second axes that are different from each other and are coupled to one another.

The first through third circuit bodies are individually formed and may be coupled to one another.

The first through third cells may respectively include first through third tabs extending along the first axis, wherein the first and second cells that are adjacent to each other are arranged to face each other in order to have first and second tabs extending to face each other, and the second and third cells that are adjacent to each other are arranged in the same orientation in order to have the second and third tabs extending in the same direction.

The first circuit body may be connected to the first and second tabs extending to face each other along the first axis, and the second circuit body may be connected to the third tab from among the second and third tabs extending in the same direction along the first axis.

The third circuit body may extend across end portions of the first and second circuit bodies, and may include both end portions connected to the end portions of the first and second circuit bodies.

The first through third circuit bodies may be arranged to surround the second cell located at an intermediate position, from among the first through third cells arranged along the first axis.

From among the first through third circuit bodies, a circuit body formed of a rigid circuit board may be coupled to another circuit board formed of a flexible circuit board.

From among the first through third circuit bodies, a circuit body formed of a rigid circuit board may not be coupled to another circuit board formed of a rigid circuit board.

A connector connected to an external device may be connected to a circuit body formed of a rigid circuit board, from among the first through third circuit bodies.

A connection pad for connection with at least one of the first through third cells may be formed in the first and second circuit bodies, wherein a circuit body formed of a flexible circuit board from among the first and second circuit bodies includes a conductive pattern layer including an isolated portion formed at a position corresponding to the connection pad and a bypass portion insulated from the isolated portion with an insulating gap therebetween.

The isolated portion and the bypass portion may be formed in a second conductive pattern layer insulated from a first conductive pattern layer connected to the connection pad with an insulating layer therebetween.

The insulating gap may be formed to surround the connection pad or the isolated portion.

The insulating gap may be formed in a closed loop shape surrounding the connection pad or the isolated portion.

The battery pack may further include: a frame configured to support the first through third cells and the first through third circuit bodies, and a first label sheet attached to the first through third cells and the first through third circuit bodies mounted on the frame.

The first label sheet may include an adhesive surface facing the first through third cells and the first through third circuit bodies, and a non-adhesive surface opposite to the adhesive surface, wherein the battery pack further includes a release paper piece attached to the adhesive surface of the first label sheet.

The release paper piece may be arranged in a shape surrounding the second cell located at an intermediate position, from among the first through third cells arranged along the first axis, to correspond to the first through third circuit bodies.

The release paper piece may cover the first through third circuit bodies located along an edge of the second cell, and cover edge portions of the first through third cells adjacent to the first through third circuit bodies.

BRIEF DESCRIPTION OF THE DRAWINGS

Features will become apparent to those of skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

Hereinafter, a battery pack will be described according to embodiments with reference to the accompanying drawings.

Figure 1:
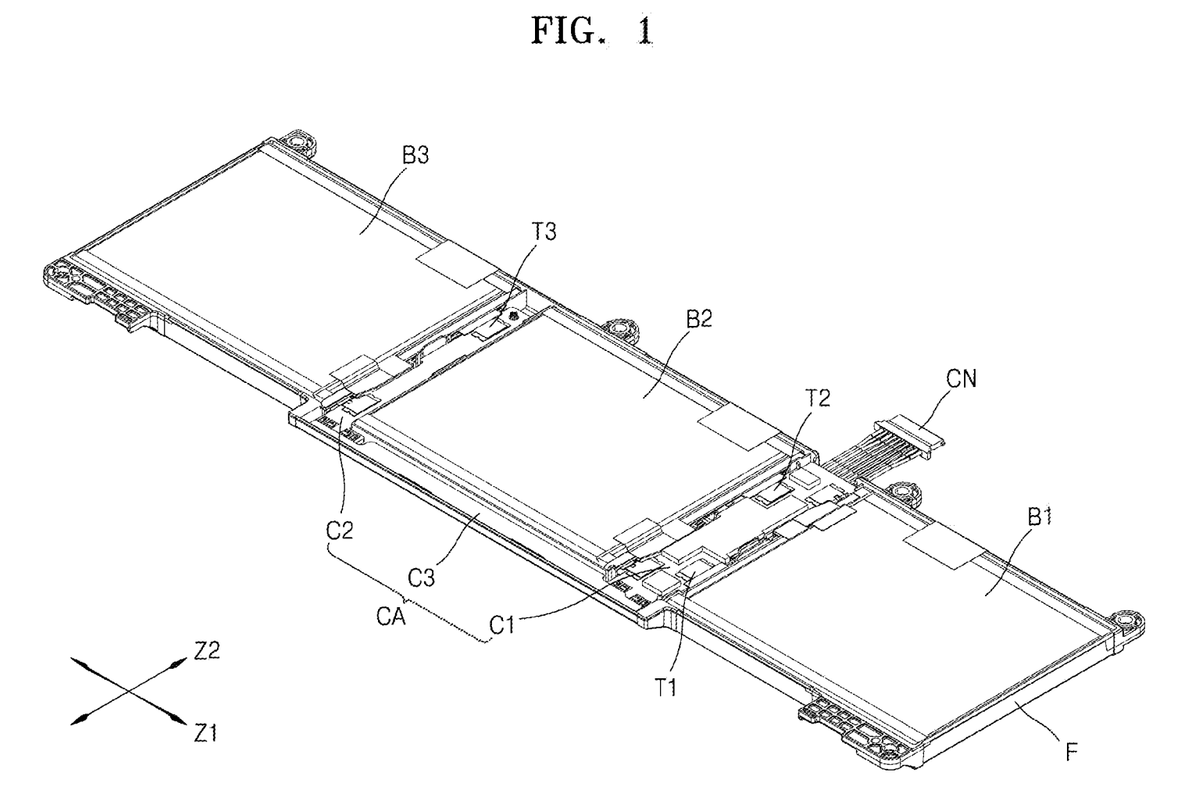
FIG. 1 is a perspective view of a battery pack, according to an embodiment of the disclosure.
Figure 2:
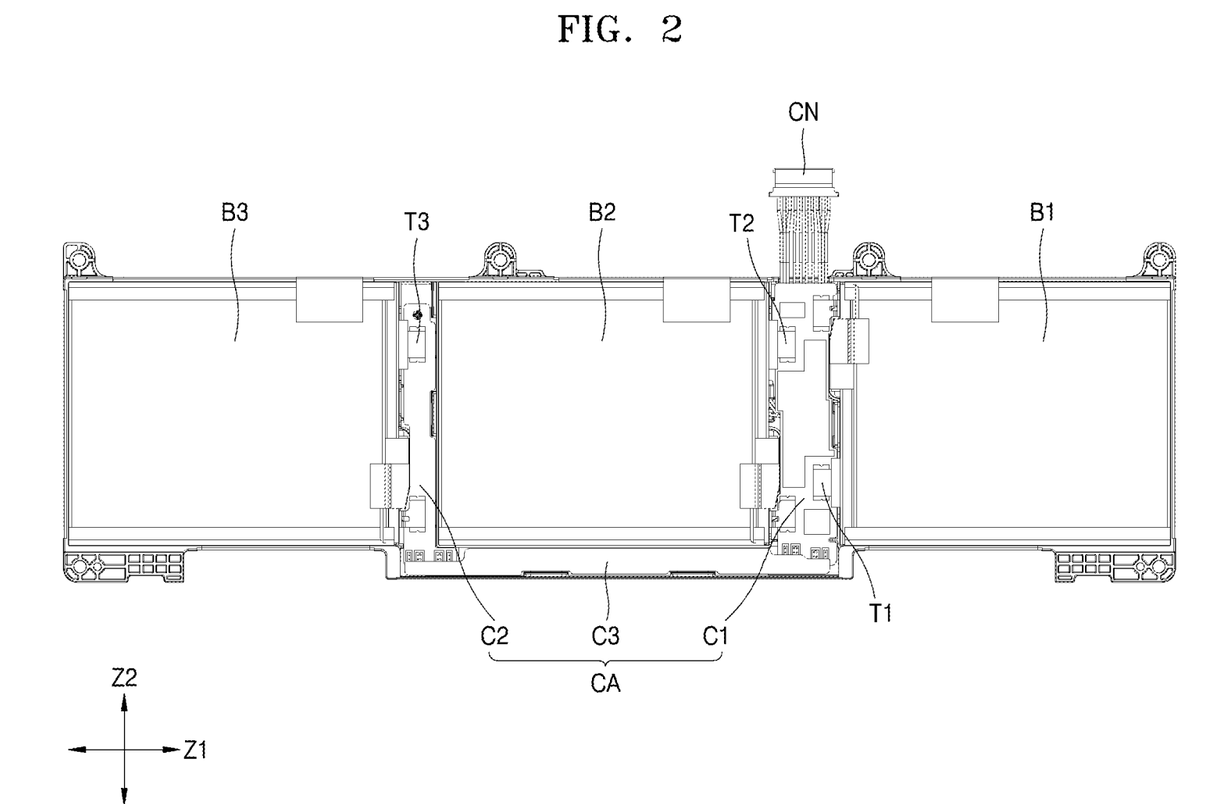
FIG. 2 is a plan view of the battery pack of FIG. 1.
Figure 3:
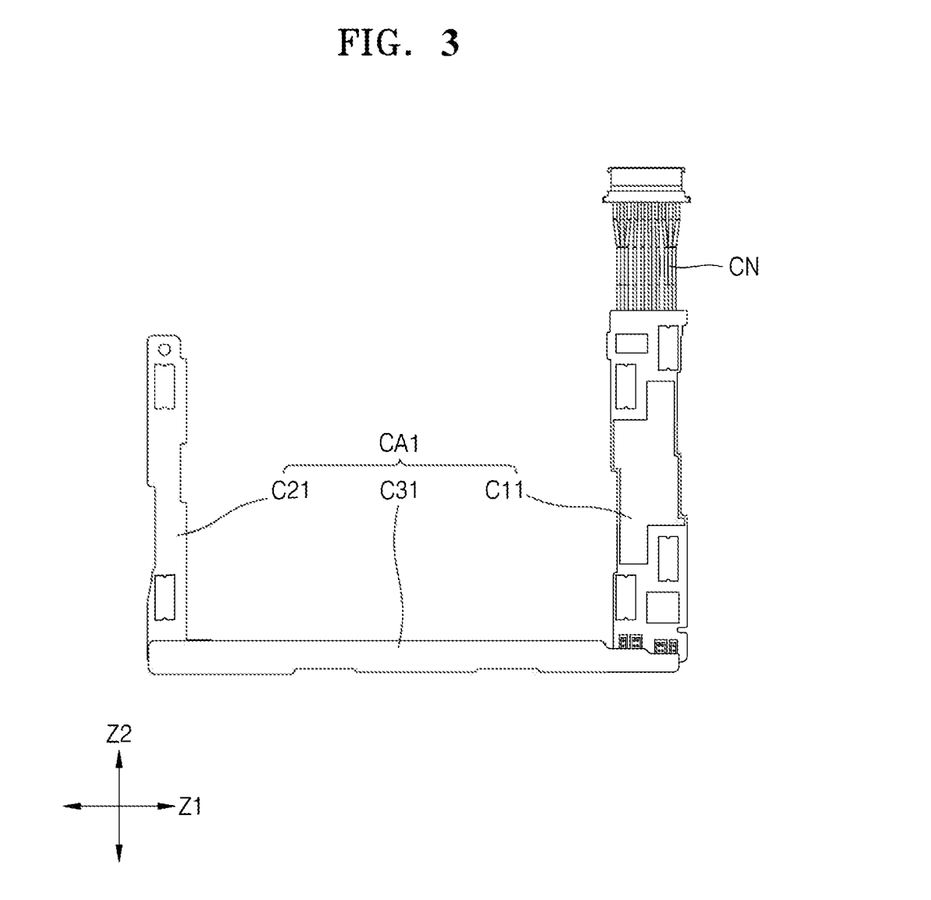
FIGS. 3 and 4 are views of a modified embodiment of FIG. 2.
Figure 4:
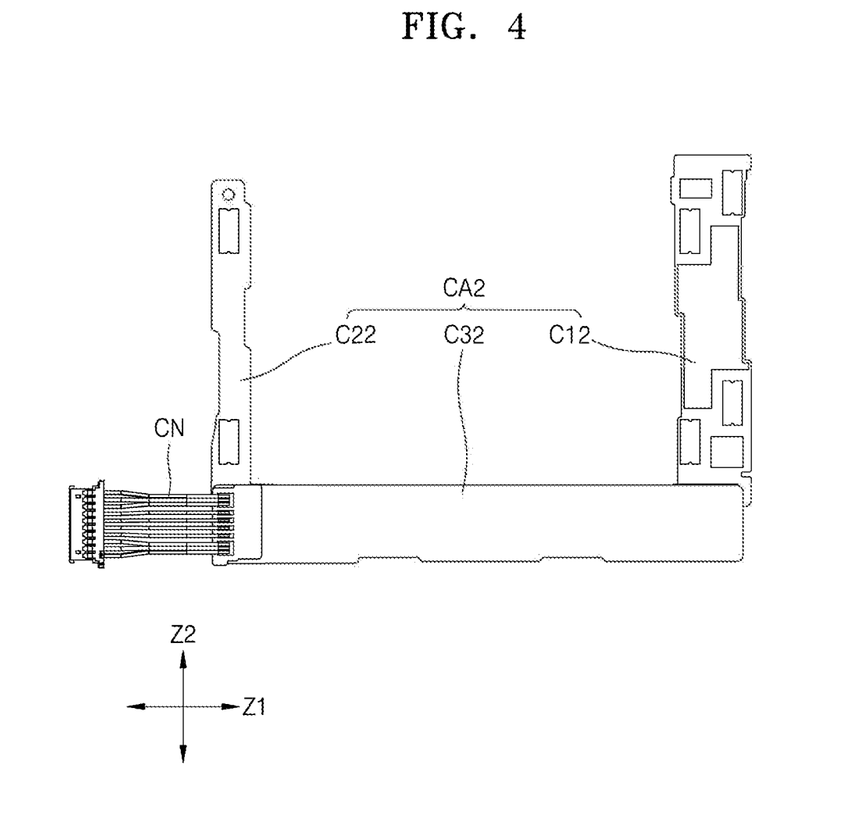

FIG. 1 is a perspective view of a battery pack, according to an embodiment of the disclosure. FIG. 2 is a plan view of the battery pack of FIG. 1. FIGS. 3 and 4 are views illustrating a modified embodiment of FIG. 2.

Referring to FIGS. 1 and 2, a battery pack of the disclosure may include first through third cells B1, B2, and B3 arranged along a first axis Z1. The first through third cells B1, B2, and B3 may be adjacent to each other along the first axis Z1, e.g., the second cell B2 may be between the first cell B1 and the third cell B3. For example, as illustrated in FIGS. 1 and 2, the first and second cells B1 and B2 may be arranged to have their respective first and second tabs T1 and T2 extend to face each other along the first axis Z1. That is, the first tabs T1 of the first cell B1 may extend along the first axis Z1 toward the second cell B2, and the second tabs T2 of the second cell B2 may extend along the first axis Z1 toward the first tabs T1 of the first cell B1. The third tabs T3 of the third cell B3 may extend along the first axis Z1 toward the second cell B2.

As further illustrated in FIGS. 1 and 2, the battery pack may include a circuit assembly CA with first through third circuit bodies C1, C2, and C3 to connect the first through third cells B1, B2, and B3 to each other. The first circuit body C1 may extend along a second axis Z2, which intersects the first axis Z1, between the first and second cells B1 and B2, and may be connected to the first and second tabs T1 and T2 of the first and second cells B1 and B2. The second circuit body C2 may extend along the second axis Z2 between the second and third cells B2 and B3, and may be connected to the third tab T3 of the third cell B3. The third circuit body C3 may extend along the first axis Z1 to connect the first and second circuit bodies C1 and C2 to each other, e.g., the third circuit body C3 may extend along an edge of the second cell B3 to connect to outermost edges of the first and second circuit bodies C1 and C2. At least one of the first through third circuit bodies C1, C2, and C3 may include a rigid circuit board, and at least another one of the first through third circuit bodies C1, C2, and C3 may include a flexible circuit board.

In detail, the battery pack of the disclosure may include a plurality of cells B1, B2, and B3 arranged along the first axis Z1, and the battery pack according to an embodiment of the disclosure may include the first through third cells B1, B2, and B3 arranged along the first axis Z1. The battery pack according to various embodiments of the disclosure may include a plurality of cells including the first through third cells B1, B2, and B3, and technical features described below are not limited to the number of cells B1, B2, and B3 included in the battery pack.

Each of the first through third cells B1, B2, and B3 may include an electrode assembly and a casing for sealing the electrode assembly, and may respectively include the first through third tabs T1, T2, and T3. The first through third tabs T1, T2, and T3 may be drawn out from the electrode assembly to the outside of the casing of a corresponding one of the first through third cells B1, B2, and B3, respectively. In this case, each of the first through third tabs T1, T2, and T3 may extend from a cell body including the electrode assembly and the casing to the outside.

The battery pack according to an embodiment of the disclosure may include the first through third cells B1, B2, and B3 arranged along the first axis Z1, and the first through third cells B1, B2, and B3 may include the first through third tabs T1, T2, and T3 extending along the first axis Z1. In this case, the first through third cells B1, B2, and B3 may be aligned along the first axis Z1, and the first through third cells B1, B2, and B3 may be arranged to face one another or may be arranged in the same direction according to directions in which the first through third tabs T1, T2, and T3 extend along the first axis Z1. In more detail, the first and second cells B1 and B2 that are adjacent to each other may be arranged to face each other in order to have the first and second tabs T1 and T2 extending to face each other, and the second and third cells B2 and B3 that are adjacent to each other may be arranged in the same orientation in order to have the second and third tabs T2 and T3 extending in the same direction.

The first through third cells B1, B2, and B3 may be electrically connected to one another through the circuit assembly CA, such that a charging current may be input from an external charger to the first through third cells B1, B2, and B3 through the circuit assembly CA and/or a discharging current of the first through third cells B1, B2, and B3 may be output to an external load through the circuit assembly CA. That is, the circuit assembly CA may connect the first through third cells B1, B2, and B3 to the external charger, or may connect the first through third cells B2, B2, and B3 to the external load.

In an embodiment of the disclosure, the circuit assembly CA may include the first circuit body C1 located between the first and second cells B1 and B2 that are adjacent to each other, the second circuit body C2 located between the second and third cells B2 and B3 that are adjacent to each other, and the third circuit body C3 configured to electrically connect the first and second circuit bodies C1 and C2 located with the second cell B2 therebetween. The first and second circuit bodies C1 and C2 may have similar physical arrangements in that the first and second circuit bodies C1 and C2 are located between adjacent cells, i.e., the first and second circuit bodies C1 and C2 are respectively located between the first and second cells B1 and B2 that are adjacent to each other and between the second and third cells B2 and B3 that are adjacent to each other. However, the first and second circuit bodies C1 and C2 may have different electrical connections in that objects connected by the first and second circuit bodies C1 and C2 are different from each other.

In more detail, the first circuit body C1 may connect the first and second tabs T1 and T2 extending to face each other along the first axis Z1, and may electrically connect the first and second cells B1 and B2. That is, the first circuit body C1 may be connected to the first and second tabs T1 and T2 extending to face toward the first circuit body C1, and may electrically connect the first and second cells B1 and B2. In contrast, the second circuit body C2 may be connected to the third tab T3, except for the second tab T2 connected to the first circuit body C1, from among the second and third tabs T2 and T3 extending in the same direction along the first axis Z1, and may be electrically connected to the third cell B3. As such, although the first and second circuit bodies C1 and C2 are similar to each other in that the first and second circuit bodies C1 and C2 are located between the first and second cells B1 and B2 that are adjacent to each other or between the second and third cells B2 and B3 that are adjacent to each other, the first and second circuit bodies C1 and C2 are different from each other in that the first circuit body C1 forms an electrical connection with both the first and second cells B1 and B2 located on both sides of the first circuit body C1, whereas the second circuit body C2 forms an electrical connection only with the third cell B3 from among the second and third cells B2 and B3 located on both sides of the second circuit body C2.

The first circuit body C1 forms an electrical connection with the first and second cells B1 and B2, and the second circuit body C2 forms an electrical connection with the third cell B3. Therefore, when the first and second circuit bodies C1 and C2 are connected to each other, current of the first through third cells B1, B2, and B3 may be collected to one charge/discharge path. That is, the first circuit body C1 that forms the electrical connection with the first and second cells B1 and B2, and the second circuit body C2 that forms the electrical connection with the third cell B3 may be electrically connected to each other through the third circuit body C3 that connects the first and second circuit bodies C1 and C2.

In more detail, the third circuit body C3 may electrically connect the first and second circuit bodies C1 and C2 located with the second cell B2 therebetween, may extend across the second cell B2, and may include both end portions connected to the first and second circuit bodies C1 and C2. When the third circuit body C3 extends across the second cell B2, it may mean that the third circuit body C3 extends across a side surface, e.g., along an edge, of the second cell B2 rather than across a main surface of the second cell B2. For example, when the second cell B2 has a substantially hexahedral shape, the main surface may refer to a surface having a largest area from among six surfaces, and the side surface may refer to a surface connected to the main surface and having a relatively small area. In more detail, the side surface may refer to a surface other than a front surface from which the second tab T2 is drawn out and a rear surface opposite to the front surface, from among surfaces connected to the main surface.

The third circuit body C3 may extend along the first axis Z1 along which the first through third cells B1, B2, and B3 are arranged, may extend across end portions of the first and second circuit bodies C1 and C2 arranged along the second axis Z2, and may include both end portions connected to the end portions of the first and second circuit bodies C1 and C2. In this case, both end portions of the third circuit body C3 connected to the first and second circuit bodies C1 and C2 refer to a first end portion and a second end portion of the third circuit body C3 along the first axis Z1.

In an embodiment of the disclosure, the first through third circuit bodies C1, C2, and C3 may extend along the first axis Z1 or the second axis Z2, and may exclusively extend along any one of the first axis Z1 and the second axis Z2. The second axis Z2 is a direction that intersects the first axis Z1 along which the first through third cells B1, B2, and B3 are arranged. In an embodiment of the disclosure, the second axis Z2 may refer to a direction that perpendicularly intersects the first axis Z1. The first axis Z1 may refer to a direction in which the first through third cells B1, B2, and B3 are arranged, and the second axis Z2 may refer to a direction that perpendicularly intersects the first axis Z1. In an embodiment of the disclosure, the first through third cells B1, B2, and B3 may be provided as polygonal cells having substantially hexahedral shapes, and the first and second axes Z1 and Z2 may refer to directions in which two different surfaces contacting each other through one corner of such a polygonal cell extend. For example, in an embodiment of the disclosure, the first axis Z1 may refer to a direction parallel to a side surface of each of the first through third cells B1, B2, and B3, and the second axis Z2 may refer to a direction parallel to a front surface from which the first through third tabs T1 through T3 are drawn out or a rear surface opposite to the front surface in the first through third cells B1, B2, and B3.

In an embodiment of the disclosure, when the first through third circuit bodies C1, C2, and C3 exclusively extend along any one of the first axis Z1 and the second axis Z2, it may mean that the first through third circuit bodies C1, C2, and C3 longitudinally extend along only one of the first axis Z1 and the second axis Z2. Even when the first through third circuit bodies C1, C2, and C3 exclusively extend along any one of the first axis Z1 and the second axis Z2, the first through third circuit bodies C1, C2, and C3 may not all extend along the same first axis Z1 or the same second axis Z2. The first through third circuit bodies C1, C2, and C3 may be coupled to one another for electrical connection therebetween, e.g., to connect charge/discharge paths to one another. To this end, at least one of the first through third circuit bodies C1, C2, and C3 may extend along the first axis Z1 and at least another one of the first through third circuit bodies C1, C2, and C3 may extend along the second axis Z2 to couple the first through third circuit bodies C1, C2, and C3.

The first through third circuit bodies C1, C2, and C3 extending along any one of the first axis Z1 and the second axis Z2 may be coupled to one another to constitute one circuit assembly CA. When the first through third circuit bodies C1, C2, and C3 are coupled to one another to constitute one circuit assembly CA, it means that the circuit assembly CA formed in a bent shape along the first axis Z1 and the second axis Z2 is not integrally formed to have a common base, but the circuit assembly CA formed in a bent shape along the first axis Z1 and the second axis Z2 is formed by coupling the first through third circuit bodies C1, C2, and C3 individually formed and having different bases. For example, the individually formed first through third circuit bodies C1, C2, and C3 may each be a discrete or distinct circuit on a separate linear base, e.g., substrate or film, and are only subsequently electrically and/or physically connected to each other via a circuit connector, e.g., an adhesive or a screw. The term 'base' of the first through third circuit bodies C1, C2, and C3 or the circuit assembly CA used herein refers to an insulating substrate or an insulating film on which the first through third circuit bodies C1, C2, and C3 or the circuit assembly CA is formed. The first through third circuit bodies C1, C2, and C3 or the circuit assembly CA may be formed by forming a conductive pattern layer on the insulating substrate or the insulating film. As described below, because the circuit assembly CA is not integrally formed along the first axis Z1 and the second axis Z2 that are different from each other, but the circuit assembly CA is rather formed to have a bent shape along the first axis Z1 and the second axis Z2 (which are different from each other) by coupling the first through third circuit bodies C1, C2, and C3, each formed in a band shape along each axis, waste of materials may be prevented and manufacturing costs may be reduced.

In an embodiment of the disclosure, the first through third circuit bodies C1, C2, and C3 may be arranged to surround any one cell, and may be coupled to one another. For example, in an embodiment of the disclosure, the first through third circuit bodies C1, C2, and C3 may be arranged to surround the cell B2 located at an intermediate position, from among the first through third cells B1, B2, and B3 arranged along the first axis Z1, may surround the periphery of the second cell B2, and may electrically connect the first through third cells B1, B2, and B3. The circuit assembly CA including the first through third circuit bodies C1, C2, and C3 may substantially have a bent shape extending along the first and second axes Z1 and Z2 that are different from each other, and each of the first through third circuit bodies C1, C2, and C3 constituting the circuit assembly CA may extend along any one of the first axis Z1 and the second axis Z2 and may not have a bent shape extending along the first axis Z1 and the second axis Z2, which will be described below in more detail.

In an embodiment of the disclosure, the first and second circuit bodies C1 and C2 may be formed in a band shape along the second axis Z2, and the third circuit body C3 may be formed in a band shape along the first axis Z1. For example, each of the first through third circuit bodies C1, C2, and C3 may be formed in a band shape, e.g., a linear shape, longitudinally extending along one axis, e.g., along a single axis, and may include both a portion along the first axis Z1 and a portion along the second axis Z2, e.g., one of a length/width dimensions along one axis and another of the length/width dimensions along a perpendicular axis, and thus may not have a bent shape. As such, in the disclosure, because each of the first through third circuit bodies C1, C2, and C3 is formed in a band shape along any one of the first axis Z1 and the second axis Z2, manufacturing costs of the circuit assembly CA including the first through third circuit bodies C1, C2, and C3 may be reduced.

In an embodiment of the disclosure, at least one of the first through third circuit bodies C1, C2, and C3 may be formed based on an insulating substrate cut to a unit size from a mother substrate. In this case, because the first through third circuit bodies C1, C2, and C3 are formed in a band, e.g., linear, shape extending along an axis, scraps wasted when an individual insulating substrate is cut from a mother substrate may be reduced.

If a circuit assembly including first through third circuit bodies were to be formed of a single bent insulating substrate, i.e., an integral insulating substrate, accommodating, e.g., supporting, all the first through third circuit bodies (rather than electrically connecting three discrete and separate insulating substrates to each other), the single insulating substrate would have been formed in a bent shape along the first axis Z1 and the second axis Z2, thereby generating scraps wasted when the single insulating substrate is cut and increasing manufacturing costs. For example, when a single insulating substrate having a bent shape including a portion extending along the first axis Z1 and a portion extending along the second axis Z2 is cut from a mother substrate, an inner portion surrounded by the portion extending along the first axis Z1 and the portion extending along the second axis Z2 may be wasted as useless scraps, thereby increasing manufacturing costs due to the wasted scraps. Also, cracks may occur in a relatively weak bent edge portion of the single insulating substrate, e.g., when an external force is applied to the bent edge portion, thereby causing damage, e.g., distortion and cracks, in the bent edge portion of the rigid insulating substrate.

In contrast, according to example embodiments, each of the first through third circuit bodies C1, C2, and C3 may have a band shape extending along any one of the first axis Z1 and the second axis Z2, e.g., each of the circuit bodies C1, C2, and C3 may extend along a single axis without bending, and the circuit assembly CA having a bent shape extending in the first axis Z1 and the second axis Z2 may be formed by coupling the first through third circuit bodies C1, C2, and C3 to each other. In an embodiment of the disclosure, the circuit assembly CA including the first through third circuit bodies C1, C2, and C3 may include at least one rigid circuit board and at least one flexible circuit board. A combination of the at least one rigid circuit board and the at least one flexible circuit board of the first through third circuit bodies C1, C2, and C3 may be appropriately designed so that rigid circuit boards relatively vulnerable to cracks are not coupled to each other. For example, a rigid circuit board and a flexible circuit board may be coupled to each other, while rigid circuit boards may not be coupled to each other. For example, referring to FIG. 2, each of the first and second circuit bodies C1 and C2 may be formed of a rigid circuit board, and may be connected to each other through the third circuit body C3 formed of a flexible circuit board, e.g., so a flexible circuit board may be coupled between and connect two rigid circuit boards.

As described above, waste of materials due to scraps generated during cutting from a mother substrate and cracks in a bent edge portion along the first and second axes Z1 and Z2 may occur more in a rigid circuit board than in a flexible circuit board. For example, the rigid circuit board may be formed based on a relatively rigid insulating substrate, and the flexible circuit board may be formed based on a relatively flexible insulating film. Waste of cost due to scraps generated during a process of cutting each insulating substrate from a mother substrate (waste of cost in the rigid circuit board) may be greater than waste of cost due to scraps generated during a process of cutting each insulating film from a mother film (waste of cost in the flexible circuit board), and cracks in a bent edge portion of the relatively rigid insulating substrate (cracks in the rigid circuit board)

may more frequently occur than cracks in a bent edge portion of the relatively flexible insulating film (cracks in the flexible circuit board).

In an embodiment of the disclosure, each of the first through third circuit bodies C1, C2, and C3 may be formed of any one of a rigid circuit board and a flexible circuit board. Considering waste of cost due to scraps and cracks occurring in a bent edge portion, a combination of the rigid circuit board and the flexible circuit board in the first through third circuit bodies C1, C2, and C3 may be appropriately designed so that two rigid circuit boards do not contact each other, i.e., the rigid circuit boards may not be directly coupled to each other. For example, a circuit body formed of a rigid circuit board and a circuit body formed of a rigid circuit board may be designed not to be adjacent to each other. In an embodiment of FIG. 2, the first and second circuit bodies C1 and C2 each formed of a rigid circuit board may not be directly connected to each other, but may be connected to each other with the third circuit body C3 formed of a flexible circuit board therebetween.

However, unlike rigid circuit boards, because waste of cost due to scraps and cracks occurring in a bent edge portion of a flexible circuit board are less than those of the rigid circuit boards, two flexible circuit boards a may be designed to contact each other. That is, because a flexible circuit board is more advantageous than a rigid circuit board in terms of waste of materials due to scraps and cracks occurring in a bent edge portion, two adjacent circuit bodies formed of flexible circuit boards may be integrally formed with each other. However, embodiments are not limited thereto, and two adjacent circuit bodies formed of flexible circuit boards may not be formed integrally with each other.

For example, referring to FIG. 3, a first circuit body C11 may be formed of a rigid circuit board, and second and third circuit bodies C21 and C31 may each be formed of a flexible circuit board. The second and third circuit bodies C21 and C31 each formed of a flexible circuit board may be individually formed, e.g., as discrete or distinct units on separate films, and then may be coupled to each other, or may be integrally formed with each other. In this regard, when a circuit assembly CA1 including the first through third circuit bodies C11, C21, and C31 is formed by coupling the first through third circuit bodies C11, C21, and C31 that are individually formed, it may mean that at least the first circuit body C11 formed of a rigid circuit board is formed separately from the second and third circuit bodies C21 and C31 that are adjacent to each other, and the second and third circuit bodies C21 and C31 adjacent to each other and each formed of a flexible circuit board may be integrally formed with each other. However, embodiments are not limited thereto, and two adjacent circuit bodies may be formed either integrally with each other or not integrally (i.e., separately from each other).

In another example, the second and third circuit bodies C21 and C31 may be individually formed in a band shape extending along the second axis Z2 and the first axis Z1 and then may be coupled to each other.

In an embodiment of the disclosure, each of the first through third circuit bodies C1, C2, and C3 may include at least one of a rigid circuit board and a flexible circuit board. For example, the rigid circuit board that is based on a relatively rigid insulating substrate may have a structure in which a conductive pattern layer is formed on the insulating substrate. The flexible circuit board that is based on a relatively flexible insulating film may have a structure in which a conductive pattern layer is formed on the insulating film, and may provide flexibility.

In more detail, the circuit assembly CA including the first through third circuit bodies C1, C2, and C3 may include at least one rigid circuit board and at least one flexible circuit board. In an embodiment of FIG. 2, the first and second circuit bodies C1 and C2 may each be formed of a rigid circuit board, and the third circuit body C3 for connecting the first and second circuit bodies C1 and C2 may be formed of a flexible circuit board. However, in various embodiments of the disclosure, configurations of the first through third circuit bodies C1, C2, and C3 are not limited to those of FIG. 2, and may be modified in various ways including embodiments of FIGS. 3 and 4.

For example, referring to FIG. 4, first and second circuit bodies C12 and C22 may each be formed of a flexible circuit board, and a third circuit body C32 may be formed of a rigid circuit board. The first through third circuit bodies C12, C22, and C32 may be individually formed and then coupled to one another to constitute a circuit assembly CA2.

As such, in various embodiments of the disclosure, the circuit assembly CA including the first through third circuit bodies C1, C2, and C3 may be formed by any of various combinations of a rigid circuit board and a flexible circuit board according to a specific design. Because a rigid circuit board (a circuit body formed of a rigid circuit board from among the first through third circuit bodies C1, C2, and C3) may have a relatively high support strength and may provide a stable base, the rigid circuit board may include more conductive pattern layers than a flexible circuit board (a circuit body formed of a flexible circuit board from among the first through third circuit bodies C1, C2, and C3), and a connector CN connected to an external device may be connected to the rigid circuit board.

In detail, the connector CN for connecting the first through third cells B1, B2, and B3 to an external load or connecting the first through third cells B1, B2, and B3 to an external charger may be connected to the circuit assembly CA including the first through third circuit bodies C1, C2, and C3, may be connected to a rigid circuit board (a circuit body formed of a rigid circuit board from among the first through third circuit bodies C1, C2, and C3) that provides a stable support base. As such, because the connector CN is connected to a rigid circuit board that provides a stable support base, more conductive pattern layers (e.g., four or six layers) than those of a flexible circuit board may be formed on the rigid circuit board, and more electronic devices may be stably mounted on the rigid circuit board. The rigid circuit board (circuit body formed of the rigid circuit board from among the first through third circuit bodies C1, C2, and C3) may function as a protective circuit for controlling the circuit assembly CA. Fewer conductive pattern layers (e.g., two layers) than those of a rigid circuit board may be formed on a flexible circuit board having a relatively low support strength (circuit body formed of a flexible circuit board from among the first through third circuit bodies C1, C2, and C3), and the flexible circuit board may function as a wiring for connecting rigid circuit boards or connecting at least one of the first through third cells B1, B2, and B3 to a rigid circuit board.

In various embodiments of the disclosure, a rigid circuit board may be used to form at least one of the first through third circuit bodies C1, C2, and C3 of different positions, and in this case, the circuit body formed of the rigid circuit board may function as a protective circuit for controlling the circuit assembly CA and may provide a connection position of the connector CN connected to an external load or an external charger (external device). Accordingly, when an appropriate circuit body from among the first through third circuit bodies C1, C2, and C3 of different positions is formed of a rigid circuit board, a degree of freedom regarding the design, e.g., arrangement, of the circuit assembly CA may be increased and connection with the external load or the external charger (external device) may be efficiently made.

Figure 5:
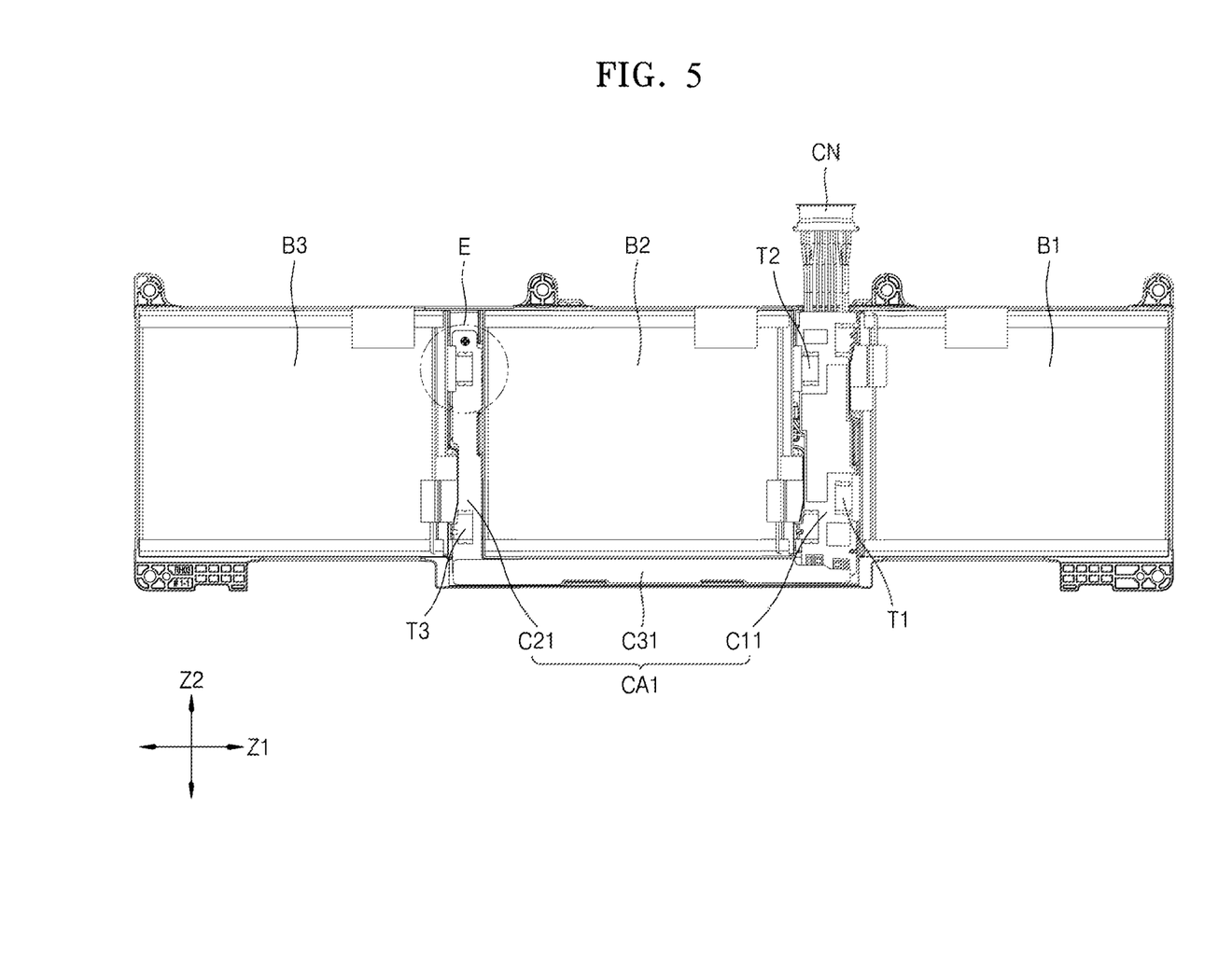
FIG. 5 is a view of a modified embodiment of the battery pack of FIG. 2.
Figure 6:
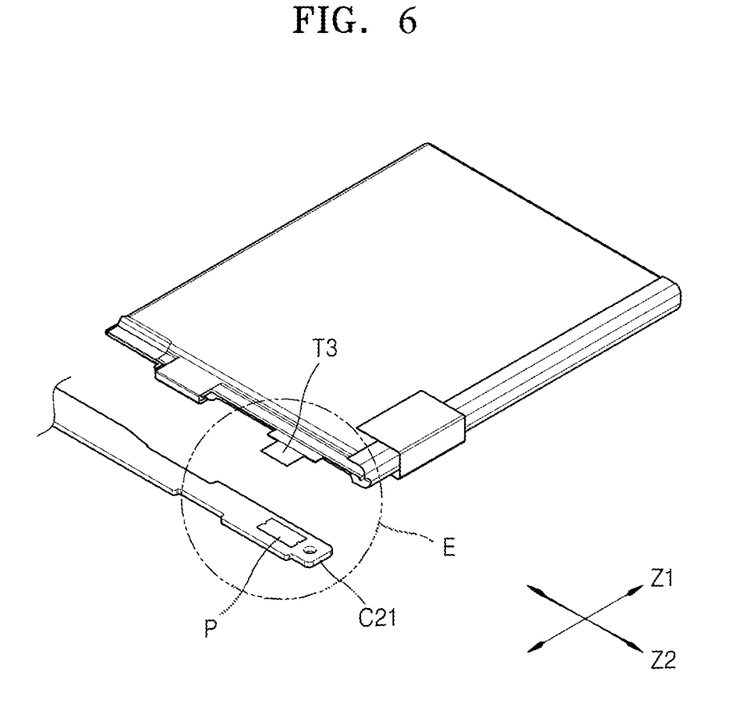
FIG. 6 is an exploded perspective view of portion E of FIG. 5.
Figure 7A:
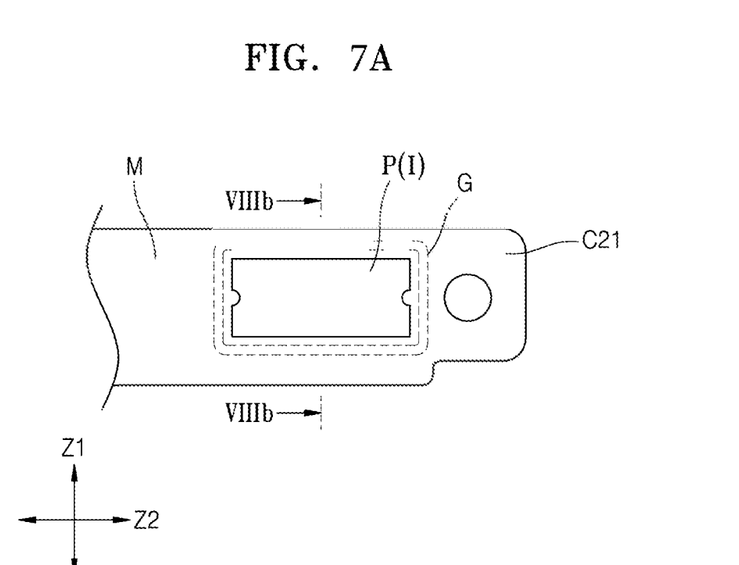
FIGS. 7A and 7B are respectively a plan view illustrating a part of FIG. 6 and a cross-sectional view taken along line VIIIb-VIIIb of FIG. 7A.
Figure 7B:
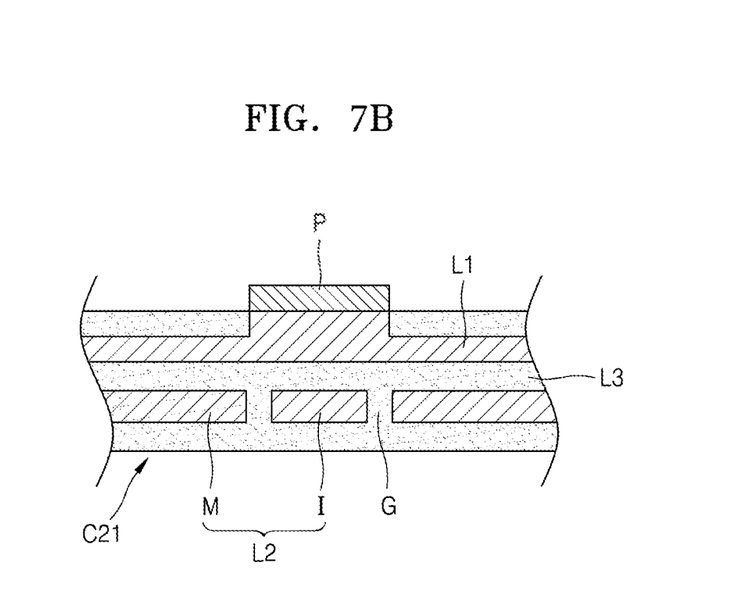

FIG. 5 is a view of a modified embodiment of the battery pack of FIG. 2. FIG. 6 is an exploded perspective view of portion E in FIG. 5, FIG. 7A is an enlarged plan view of FIG. 6, and FIG. 7B is a cross-sectional view along line VIIIb-VIIIb of FIG. 7A.

Referring to FIGS. 5 through 7B, the second circuit body C21 may include a connection pad P connected to the third tab T3. The third tab T3 may be placed on the connection pad P of the second circuit body C21, and the connection pad P of the second circuit body C21 and the third tab T3 overlapping each other may be welded to each other. Although not shown in FIGS. 6 through 7B, like the second circuit body C21, the first circuit body C11 may include connection pads connected to the first and second tabs T1 and T2, and the first and second tabs T1 and T2 placed on the connection pads of the first circuit body C11 may be welded to the connection pads of the first circuit body C11.

Because welding between the connection pad P and the third tab T3 is performed on the connection pad P, a short circuit preventing structure for preventing a short circuit due to welding heat may be applied around the connection pad P that is welded. However, the short circuit preventing structure formed around the connection pad P may be applied according to a specific structure of the first through third circuit bodies C11, C21, and C31 including the connection pad P, i.e., whether the first through third circuit bodies C11, C21, and C31 including the connection pad P are formed of a rigid circuit board or a flexible circuit board, and may be preferentially applied to a flexible circuit board (a circuit body formed of a flexible circuit board) that is formed of a relatively flexible material and thus is vulnerable to welding heat.

In the embodiment of FIGS. 5 through 7B, the second circuit body C21 may be formed of a flexible circuit board, and the short circuit preventing structure may be applied around the connection pad P of the second circuit body C21. In more detail, referring to FIG. 7B, in a thickness direction of the second circuit body C21, the connection pad P may be connected to a first conductive pattern layer L1, and the first conductive pattern layer L1 may be formed adjacent to a second conductive pattern layer L2 with an insulating layer L3 therebetween. That is, the second circuit body C21 may have a structure in which the connection pad P whose top surface is exposed, the first conductive pattern layer L1 connected to the connection pad P, the insulating layer L3, and the second conductive pattern layer L2 are sequentially stacked in the thickness direction. The second conductive pattern layer L2 may include an isolated portion I formed at a position corresponding to the connection pad P, and a bypass portion M spaced apart from the isolated portion I with an insulating gap G therebetween.

The isolated portion I may be formed at a position corresponding to, e.g., overlapping, the connection pad P, and may be short-circuited with the first conductive pattern layer L1 due to welding heat transmitted from the connection pad P and the first conductive pattern layer L1 connected to the connection pad P. That is, even when the isolated portion I is insulated from the first conductive pattern layer L1 by the insulating layer L3, the isolated portion I may be short-circuited with the first conductive pattern layer L1 while the insulating layer L3 is melted by welding heat. Accordingly, in the disclosure, the isolated portion I that may be short-circuited with the first conductive pattern layer L1 may be separated from the rest (i.e., the bypass portion M) of the second conductive pattern layer L2, so that even when the isolated portion I is short-circuited, a normal function of the second conductive pattern layer L2 is performed through the rest (i.e., the bypass portion M) of the second conductive pattern layer L2, insulation from the first conductive pattern layer L1 is maintained, and another current or signal is communicated with the first conductive pattern layer L1. In more detail, by blocking an electrical connection between the isolated portion I and the bypass portion M through the insulating gap G, even when the isolated portion I is short-circuited, a normal function of the second conductive pattern layer L2 may be performed through the bypass portion M that bypasses the isolated portion I while insulated from the isolated portion I, and insulation from the first conductive pattern layer L1 may be maintained.

Regarding a detailed structure of the isolated portion I, the isolated portion I may be electrically separated from the bypass portion M by the insulating gap G that surrounds the isolated portion I. That is, the insulating gap G may entirely surround the isolated portion I, and may be formed in a closed loop shape completely surrounding the isolated portion I. However, in another embodiment of the disclosure, the connection pad P may be formed at an edge position of the second circuit body C21, i.e., at an edge position of the second circuit body C21 contacting the outside, and thus the isolated portion I formed at a position corresponding to the connection pad P may also be located at an edge position and the insulating gap G may not be formed at a side of the isolated portion I contacting the outside. In this case, the insulating gap G may extend along an inner surface of the isolated portion I, and may be formed in a shape extending along the inner surface of the isolated portion I and open to the outside, rather than in a closed loop shape entirely surrounding the isolated portion I.

The bypass portion M separated from the isolated portion I through the insulating gap G may be formed in a shape excluding the isolated portion I from the second conductive pattern layer L2. For example, the bypass portion M may be formed to bypass the isolated portion I. The bypass portion M may be formed to bypass the isolated portion I at a position corresponding to the connection pad P, and may extend parallel with a full width, like the first conductive pattern layer L1, at a position where the connection pad P is not formed.

In an embodiment of the disclosure, the isolated portion I and the bypass portion M may be formed in the second circuit body C21 formed of a relatively flexible circuit board, and the isolated portion I and the bypass portion M may not be formed in the first circuit body C11 formed of a relatively rigid circuit board. That is, because a short circuit due to welding heat applied to the connection pad P may occur more in a flexible circuit board that is vulnerable to welding heat than in a rigid circuit board, the isolated portion I and the bypass portion M may not be formed in the rigid circuit board. Also, the isolated portion I and the bypass portion M may not be formed in the third circuit body C31 that connects the first and second circuit bodies C11 and C21 and may not form direct connection with the first through third cells B1, B2, and B3, i.e., may not include the connection pad P for connection with the first through third cells B1, B2, and B3. However, in various embodiments of the disclosure, even in the first circuit body C11, in a similar shape to that of the second circuit body C21, the isolated portion I may be formed at a position corresponding to the connection pad P, and the bypass portion M insulated from the isolated portion I may be formed with the insulating gap G therebetween.

Figure 8:
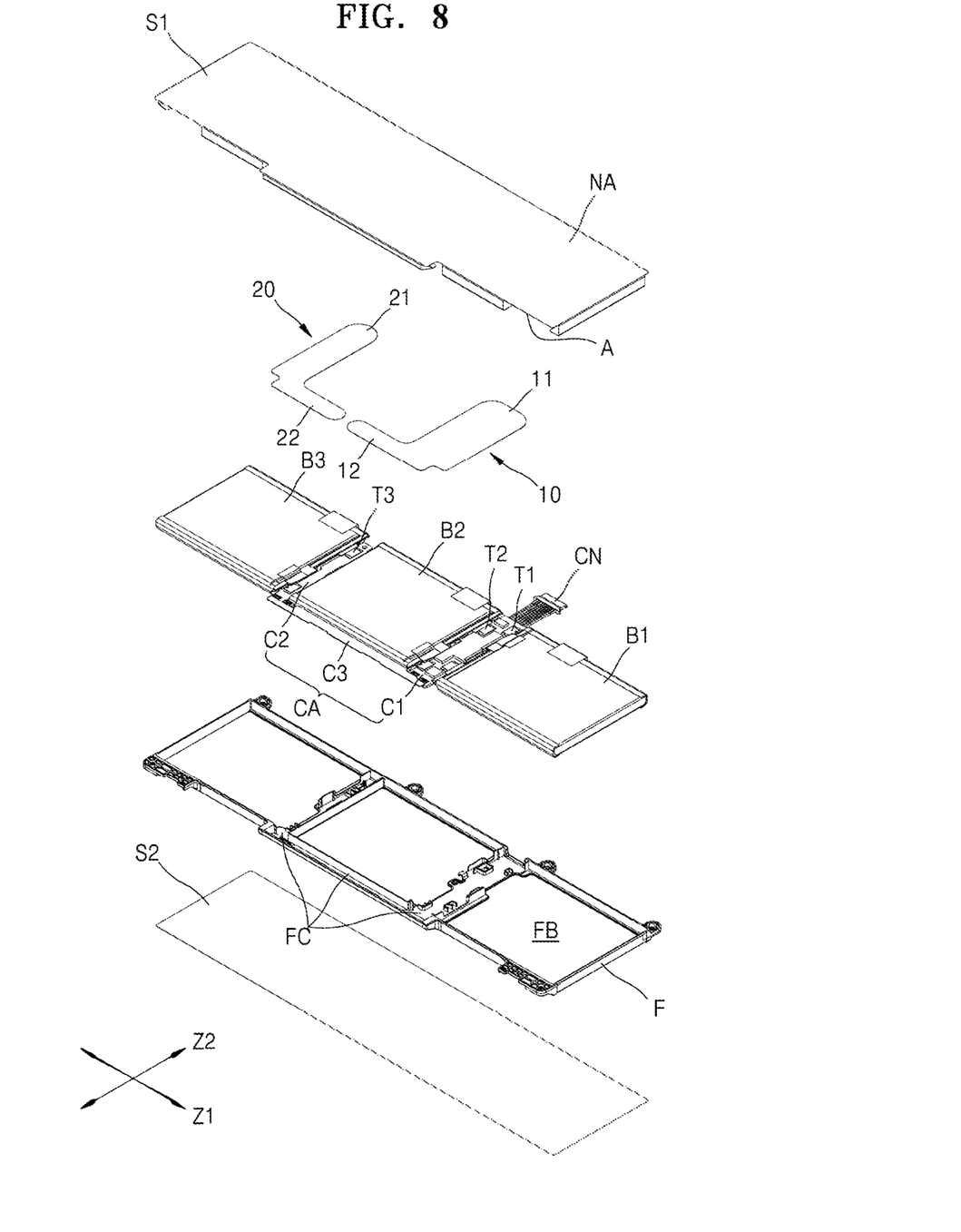
FIG. 8 is an exploded perspective view of a battery pack, according to another embodiment of the disclosure.
Figure 9:
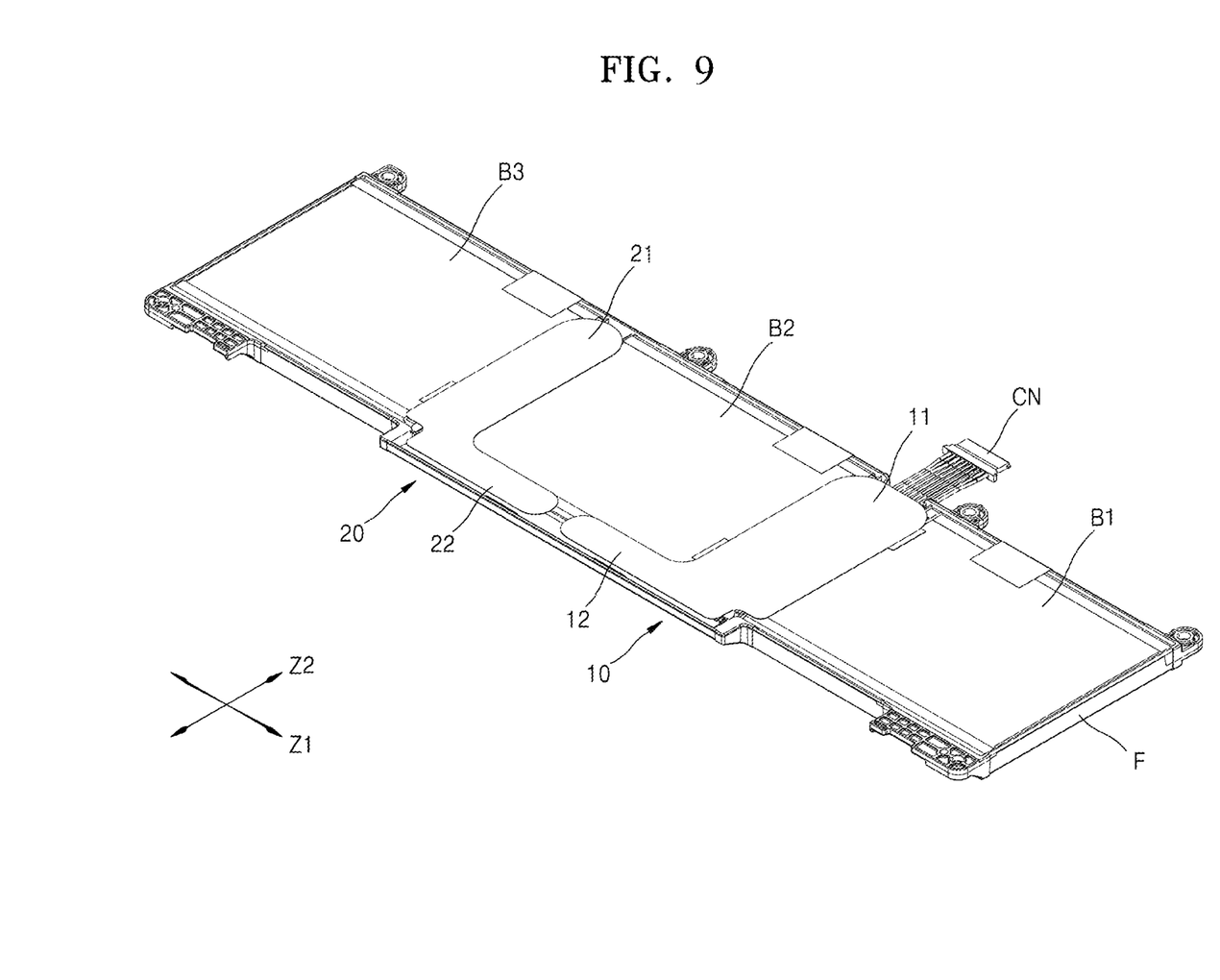
FIG. 9 is a perspective view of a part of the battery pack of FIG. 8.

FIG. 8 is an exploded perspective view of a battery pack, according to another embodiment of the disclosure. FIG. 9 is a perspective view of a part of the battery pack of FIG. 8.

Referring to FIGS. 8 and 9, the battery pack may include a frame F for supporting a plurality of cells, e.g., the first through third cells B1, B2, and B3, and a plurality of circuit bodies, e.g., the first through third circuit bodies C1, C2, and C3 electrically connected to the first through third cells B1, B2, and B3. The frame F may include a cell area FB in which the first through third cells B1, B2, and B3 are located, and a circuit area FC that is formed adjacent to the cell area FB and in which the first through third circuit bodies C1, C2, and C3 are located. For example, the circuit area FC may include the circuit area FC formed between adjacent cell areas FB, and another circuit area FC formed across, e.g., along an edge of, at least one cell area FB (e.g., the cell area FB in which the second cell B2 is located).

The first through third cells B1, B2, and B3 and the first through third circuit bodies C1, C2, and C3 may be respectively mounted in the cell area FB and the circuit area FC of the frame F, and label sheets S1 and S2 may be attached to the frame F on which the first through third cells B1, B2, and B3 and the first through third circuit bodies C1, C2, and C3 are mounted to firmly couple the first through third cells B1, B2, and B3 and the first through third circuit bodies C1, C2, and C3 to the frame F. In an embodiment of the disclosure, the label sheets S1 and S2 may include first and second label sheets S1 and S2 attached to both upper and lower sides of the frame F. In an embodiment of the disclosure, the first label sheet S1 may be attached to the first through third cells B1, B2, and B3 and the first through third circuit bodies C1, C2, and C3 mounted on the frame F, and the second label sheet S2 may be attached to the frame F that supports the first through third cells B1, B2, and B3 and the first through third circuit bodies C1, C2, and C3. The first and second label sheets S1 and S2 may firmly couple the frame F to the first through third cells B1, B2, and B3 and the first through third circuit bodies C1, C2, and C3 mounted on the frame F on both upper and lower sides of the frame F.

In an embodiment of the disclosure, release paper pieces 10 and 20 may be attached to the first label sheet S1 attached to the first through third cells B1, B2, and B3 and the first through third circuit bodies C1, C2, and C3 mounted on the frame F. For example, the first label sheet S1 may include an adhesive surface A facing the first through third cells B1, B2, and B3 and the first through third circuit bodies C1, C2, and C3, and a non-adhesive surface NA opposite to the adhesive surface A. The release paper pieces 10 and 20 may be located on the adhesive surface A of the first label sheet S1 to remove unstable adhesion between the first label sheet S1 and the first through third cells B1, B2, and B3 or the first through third circuit bodies C1, C2, and C3. In more detail, the release paper pieces 10 and 20 may remove unstable adhesion between the first label sheet S1 and a non-continuous surface between the first through third cells B1, B2, and B3 and the first through third circuit bodies C1, C2, and C3, thereby preventing adhesive noise occurring when the first label sheet S1 is attached to and then detached from the non-continuous surface between the first through third cells B1, B2, and B3 and the first through third circuit bodies C1, C2, and C3. The non-continuous surface may refer to a disconnected or stepped profile, not a continuous profile, formed at a boundary of a cell and a circuit body that are adjacent to each other. For example, the non-continuous surface may refer to a profile extending from the first circuit body C1 located between the first and second cells B1 and B2 to edge portions of the first and second cells B1 and B2, extending from the second circuit body C2 located between the second and third cells B2 and B3 to edge portions of the second and third cells B2 and B3, or extending from the third circuit body C3 to an edge portion of the second cell B2.

The release sheet pieces 10 and 20 may be attached to the adhesive surface A of the first label sheet S1 facing the first through third cells and the first through third circuit bodies C1, C2, and C3, and may remove adhesion between the first label sheet S1 and the non-continuous surface between the first through third cells B1, B2, and B3 and the first through third circuit bodies C1, C2, and C3. The release paper pieces 10 and 20 may be arranged along the circuit assembly CA including the first through third circuit bodies C1, C2, and C3. For example, the release paper pieces 10 and 20 may cover the first through third circuit bodies C1, C2, and C3 arranged along an edge of the second cell B2 and may cover edge portions of the first through third cells B1, B2, and B3 adjacent to the first through third circuit bodies C1, C2, and C3 to surround the second cell B2 located at an intermediate position from among the first through third cells B1, B2, and B3 arranged along the first axis Z1. In more detail, the release paper pieces 10 and 20 may include the first release paper piece 10 covering, e.g., overlapping, parts of the first circuit body C1 and the third circuit body C3, and the second release paper piece 20 covering, e.g., overlapping, parts of the second circuit body C2 and the third circuit body C3. In this case, the first release paper piece 10 may include a first portion 11 covering the first circuit body C1 and edge portions of the first and second cells B1 and B2 adjacent to each other with the first circuit body C1 therebetween, and a second portion 12 covering the third circuit body C3 and an edge portion of the second cell B2 adjacent to the third circuit body C3. In this case, the first and second portions 11 and 12 of the first release paper piece 10 may extend along the second axis Z2 and the first axis Z1 that intersect each other, and the first and second portions 11 and 12 may contact each other at an intersection between perpendicularly intersecting directions.

The edge portions of the first and second cells B1 and B2 covered by the first portion 11, i.e., edge portions adjacent to each other with the first circuit body C1 therebetween, may correspond to edge portions from which the first and second tabs T1 and T2 are drawn out. The edge portion of the second cell B2 covered by the second portion 12 may correspond to a side portion of the second cell B2 across which the third circuit body C3 extends. The first portion 11 of the first release paper piece 10 may have a width larger than that of the second portion 12, and the first portion 11 having a relatively large width may cover the edge portions of the first and second cells B1 and B2 adjacent to each other with the first circuit body C1 therebetween. In an embodiment of the disclosure, the first circuit body C1 may provide a connection position of the connector CN communicating with an external load or an external charger (external device), may be formed of a rigid circuit board to function as a protective circuit for controlling the circuit assembly CA, and may have a relatively large width. Accordingly, the first portion 11 covering the first circuit body C1 having a relatively large width may also have a relatively large width, and the first portion 11 of the first release paper piece 10 covering the first circuit body C1 may have a width larger than that of the second portion 12 of the first release paper piece 10 and larger than that of a first portion 21 or a second portion 22 of the second release paper piece 20 described below. For example, the first portion 11 of the first release paper piece 10 may have a relatively large width to cover the first circuit body C1 and the edge portions of the first and second cells B1 and B2 on both sides of the first circuit body C1, and may have a width larger than that of at least the second portion 12 covering the third circuit body C3 and the edge portion of the second cell B2 on one side of the third circuit body C3.

The second release paper piece 20 may include the first portion 21 covering the second circuit body C2 and edge portions of the second and third cells B2 and B3 adjacent to each other with the second circuit body C2 therebetween, and the second portion 22 covering the third circuit body C3 and an edge portion of the second cell B2 adjacent to the third circuit body C3. In this case, the first and second portions 21 and 22 of the second release paper piece 20 may extend along the second axis Z2 and the first axis Z1 that intersect each other, and may contact each other at an intersection between perpendicularly intersecting directions.

The edge portions of the second and third cells B2 and B3 covered by the first portion 21 are edge portions adjacent to each other with the second circuit body C2 therebetween. As the second and third cells B2 and B3 are arranged in the same direction, the edge portion of the second cell B2 covered by the first portion 21 may correspond to an edge portion opposite to the second tab T2, and the edge portion of the third cell B3 covered by the first portion 21 may correspond to an edge portion from which the third tab T3 is drawn out. The edge portion of the second cell B2 covered by the second portion 22 may correspond to a side portion of the second cell B2 across which the third circuit body C3 extends. In this case, the third circuit body C3 and the side portion of the second cell B2 adjacent to the third circuit body C3 may be partially covered by the second portion 12 of the first release paper piece 10 and the second portion 22 of the second release paper piece 20, and the second portion 12 of the first release paper piece 10 and the second portion 22 of the second release paper piece 20 may cover, along the first axis Z1, different portions of the third circuit body C3 and the side portion of the second cell B2 adjacent to the third circuit body C3. In this case, the second portion 12 of the first release paper piece 10 and the second portion 22 of the second release paper piece 20 may face each other with an interval therebetween along the first axis Z1. The first portion 21 of the second release paper piece 20 may have a width larger than that of the second portion 22, and the first portion 21 may have a relatively large width and may cover the edge portions of the second and third cells B2 and B3 with the second circuit body C2 therebetween.

Because the first and second release paper pieces 10 and 20 cover the first through third circuit bodies C1, C2, and C3 and the first through third cells B1, B2, and B3 adjacent to the first through third circuit bodies C1, C2, and C3, the first and second release paper pieces 10 and 20 may remove unstable adhesion between the first label sheet S1 and the non-continuous surface between the first through third circuit bodies C1, C2, and C3 and the first through third cells B1, B2, and B3, and may prevent adhesive noise occurring when the first label sheet S1 is attached to and then detached from the non-continuous surface between the first through third circuit bodies C1, C2, and C3 and the first through third cells B1, B2, and B3.

In a process of peeling a release paper for protecting the adhesive surface A of the first label sheet S1, the first and second release paper pieces 10 and 20 may be formed as parts of the release paper that are not separated from the first label sheet S1. For example, in the attachment of the first label sheet S1, the release paper (not shown) is peeled off from the first label sheet S1, and the adhesive surface A of the first label sheet S1 exposed by peeling the release paper is adhered to the first through third cells B1, B2, and B3 and the first through third circuit bodies C1, C2, and C3 mounted on the frame F. In this case, the first and second release paper pieces 10 and 20 that are not peeled off along with the release paper remain on the adhesive surface A of the first label sheet S1, and cover the first through third circuit bodies C1, C2, and C3 along with the first label sheet S1, may cover the adhesive surface A so as not to expose the adhesive surface A of the first label sheet S1, and may remove unstable adhesion between the first label sheet S1 and a non-continuous surface around the first through third circuit bodies C1, C2, and C3.

The first and second release paper pieces 10 and 20 may be separated from the release paper along a cut line formed on the release paper in a process of peeling the release paper from the first label sheet S1, and may remain on the first label sheet S1 without being peeled off from the first label sheet S1. In an embodiment of the disclosure, the first and second release paper pieces 10 and 20 may include round end portions, so that the first and second paper pieces 10 and 20 are smoothly separated from the release paper, and damage to the first and second release paper pieces 10 and 20, when stress concentrates on the end portions of the first and second release paper pieces 10 and 20, may be prevented. For example, in an embodiment of the disclosure, end portions of the first and second portions 11, 12, 21, and 22 of the first and second release paper pieces 10 and 20 may be round.

According to the one or more embodiments of the disclosure, a battery pack capable of reducing manufacturing costs of a circuit unit for forming a charge/discharge path of a battery cell and suppressing damage to the circuit unit is provided.

According to another aspect of the disclosure, a battery pack capable of preventing adhesive noise occurring when a label sheet is repeatedly attached to and then detached from a non-continuous surface between a battery cell and a circuit unit is provided.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A battery pack, comprising:
a first cell, a second cell, and a third cell arranged along a first axis, the second cell being between the first cell and the third cell along the first axis, the first cell including first tabs extending toward the second cell, the second cell including second tabs extending toward the first cell, and the third cell including third tabs extending toward the second cell;
a first circuit body between the first cell and the second cell;

a second circuit body between the second cell and the third cell; and a third circuit body connecting the first circuit body and the second circuit body, the third circuit body extending across end portions of the first and second circuit bodies and opposite ends of the third circuit body being electrically connected to the end portions of the first and second circuit bodies, such that the first through third circuit bodies are arranged in an approximate Π(pi) shape, as viewed in a top view, to surround three side surfaces of the second cell, wherein the third circuit body extends in a band shape along the first axis and the first and second circuit bodies extend in a band shape along a second axis, the second axis intersecting the first axis, wherein the third circuit body includes at least one flexible circuit board, and wherein at least one of the first circuit body and the second circuit body includes at least one rigid circuit board.

2. The battery pack as claimed in claim 1, wherein:
each of the first through third circuit bodies extends along only one of the first axis and the second axis, and
a circuit assembly including the first through third circuit bodies extends in a bent shape along both the first axis and the second axis.

3. The battery pack as claimed in claim 1, wherein the first through third circuit bodies include discrete bases from each other, the first through third circuit bodies being connected to each other via a circuit connector.

4. The battery pack as claimed in claim 1, wherein the first through third tabs extend along the first axis, such that the first cell and the second cell have opposite orientations, and the second cell and the third cell have a same orientation.

5. The battery pack as claimed in claim 1, wherein:
the first circuit body is electrically connected to the first tabs and the second tabs that face each other along the first axis, and
the second circuit body is electrically connected only to the third tabs among the second and third tabs, the second and third tabs extending in a direction along the first axis.

6. The battery pack as claimed in claim 1, wherein the at least one of the first through third circuit bodies that includes the rigid circuit board is coupled to at least another one of the first through third circuit bodies that includes the flexible circuit board.

7. The battery pack as claimed in claim 6, wherein the at least one of the first through third circuit bodies that includes the rigid circuit board is not coupled to another rigid circuit board.

8. The battery pack as claimed in claim 1, further comprising a connector connecting an external device to the at least one of the first through third circuit bodies that includes the rigid circuit board.

9. The battery pack as claimed in claim 1, wherein at least another one of the first through third circuit bodies that includes the flexible circuit board includes:
a connection pad;
a conductive pattern layer with an isolated portion at a position corresponding to the connection pad; and
a bypass portion insulated from the isolated portion with an insulating gap therebetween.

10. The battery pack as claimed in claim 9, wherein:
the at least another one of the first through third circuit bodies that includes the flexible circuit board further includes a first conductive pattern layer connected to the connection pad, and
the isolated portion and the bypass portion are in a second conductive pattern layer insulated from the first conductive pattern layer by an insulating layer.

11. The battery pack as claimed in claim 9, wherein the insulating gap surrounds the connection pad or the isolated portion.

12. The battery pack as claimed in claim 11, wherein the insulating gap has a closed loop shape surrounding the connection pad or the isolated portion.

13. The battery pack as claimed in claim 1, further comprising:
a frame supporting the first through third cells and the first through third circuit bodies; and
a first label sheet attached to the first through third cells and the first through third circuit bodies mounted on the frame.

14. The battery pack as claimed in claim 13, wherein:
the first label sheet includes an adhesive surface facing the first through third cells and the first through third circuit bodies, and a non-adhesive surface opposite to the adhesive surface, and
the battery pack further includes a release paper piece attached to the adhesive surface of the first label sheet.

15. The battery pack as claimed in claim 14, wherein the release paper piece is arranged in a shape surrounding the second cell to correspond to the first through third circuit bodies, the second cell being between the first and third cells along the first axis.

16. The battery pack as claimed in claim 14, wherein the release paper piece covers the first through third circuit bodies along an edge of the second cell, and covers edge portions of the first through third cells adjacent to the first through third circuit bodies.

* * * * *